Nov. 19, 1963
A. POLLAK
3,111,147
SABRE SAW MACHINE
Filed March 22, 1961
5 Sheets-Sheet 1
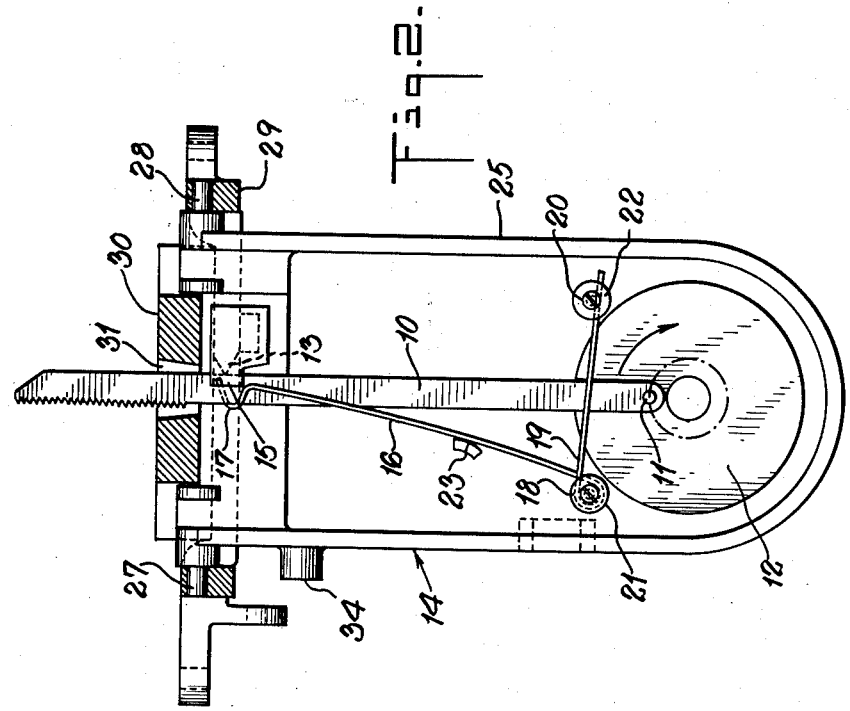
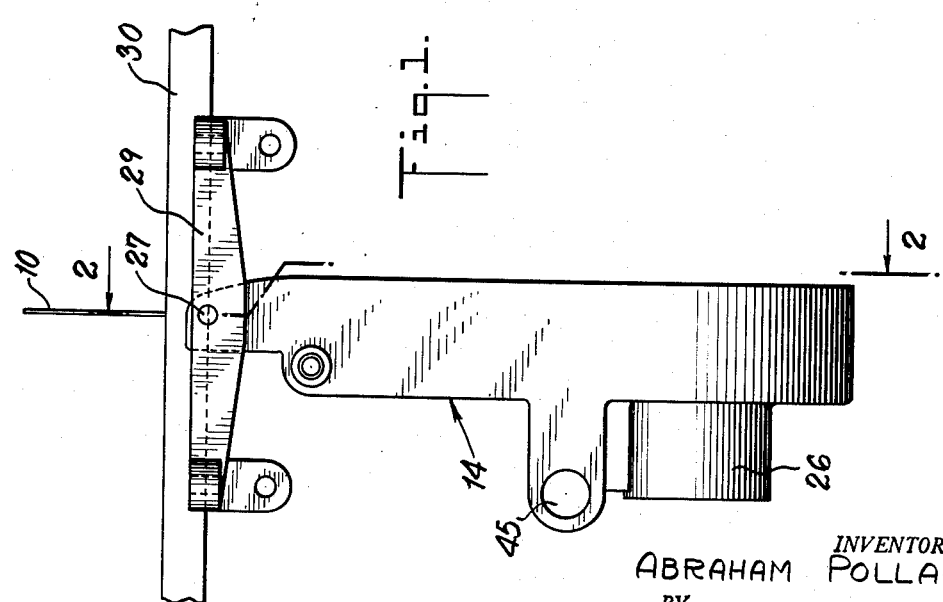
INVENTOR.
ABRAHAM POLLAK
BY
ATTORNEY

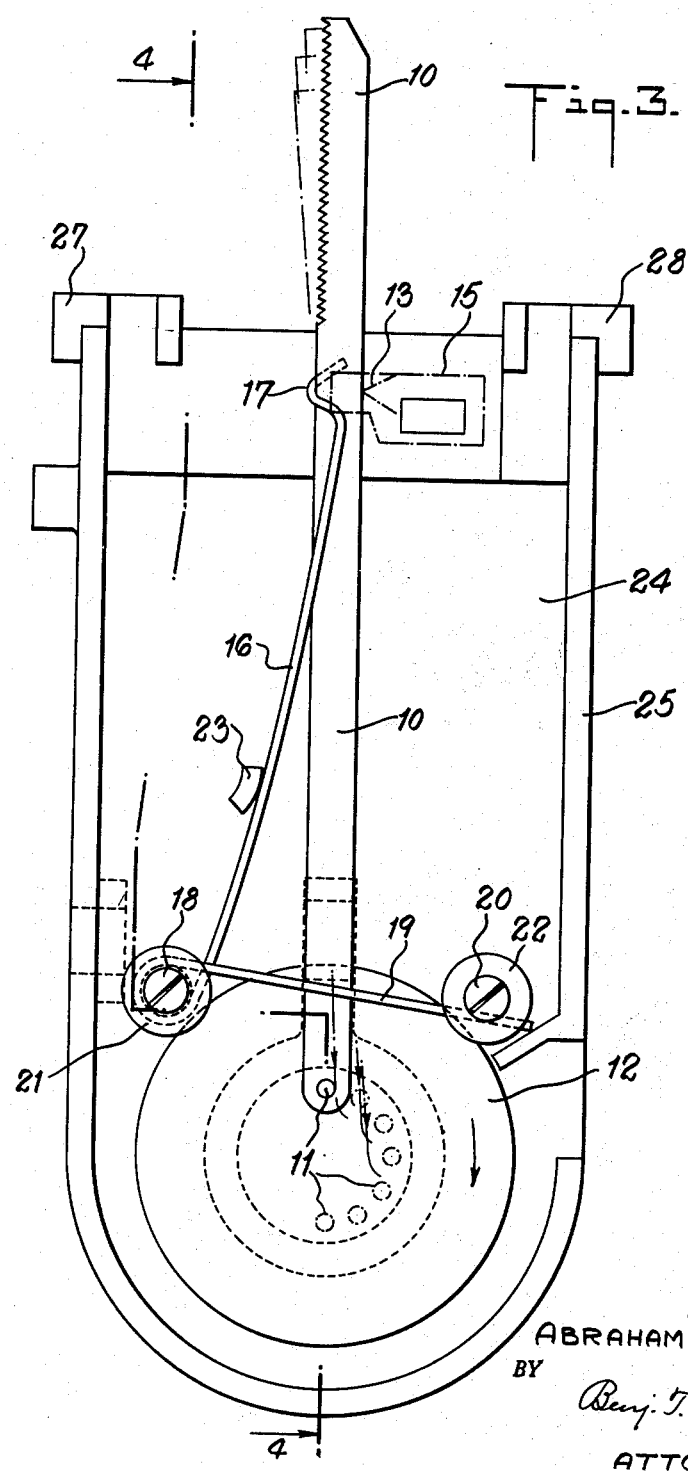

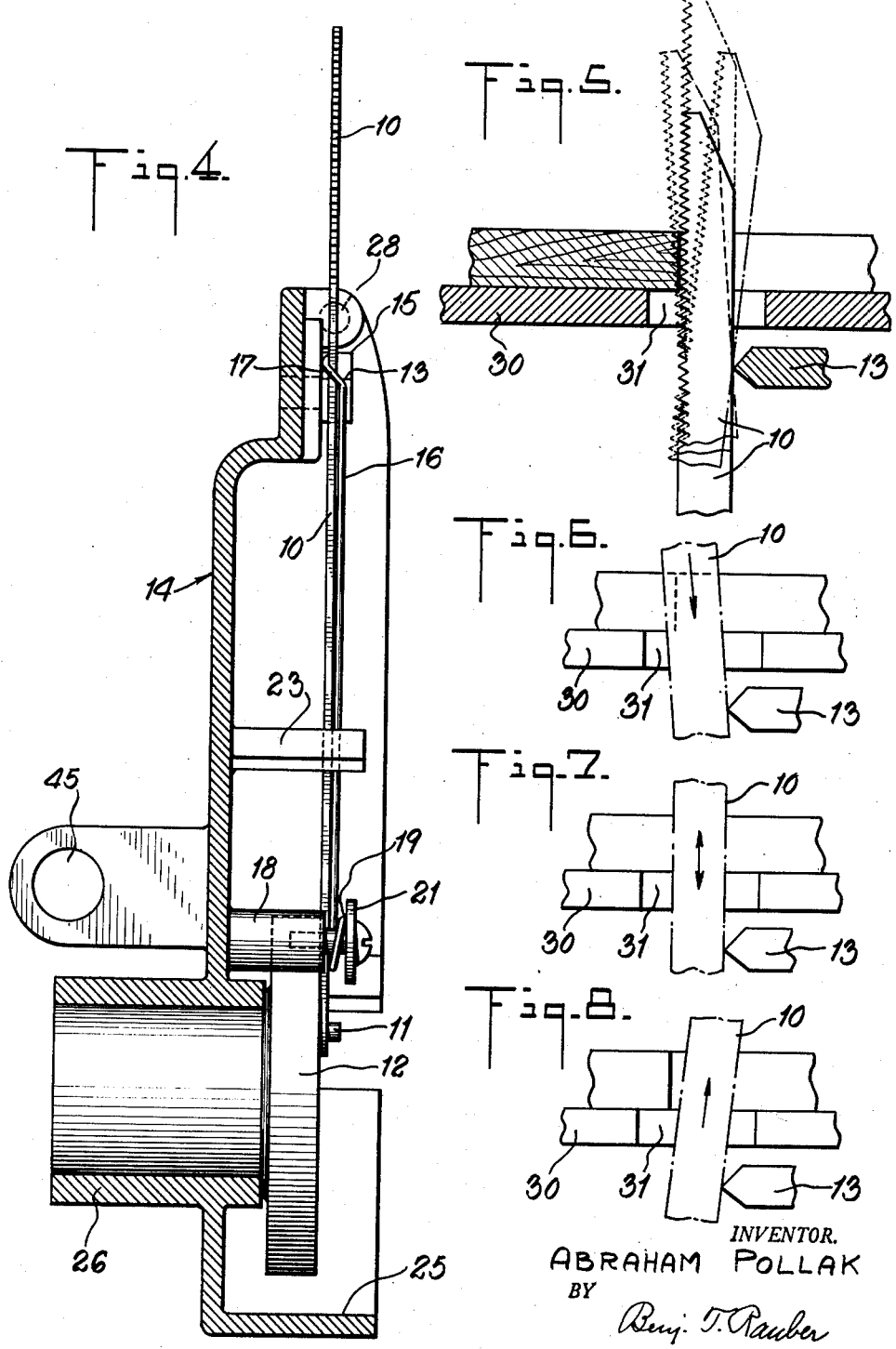

Nov. 19, 1963     A. POLLAK     3,111,147
SABRE SAW MACHINE
Filed March 22, 1961     5 Sheets-Sheet 4
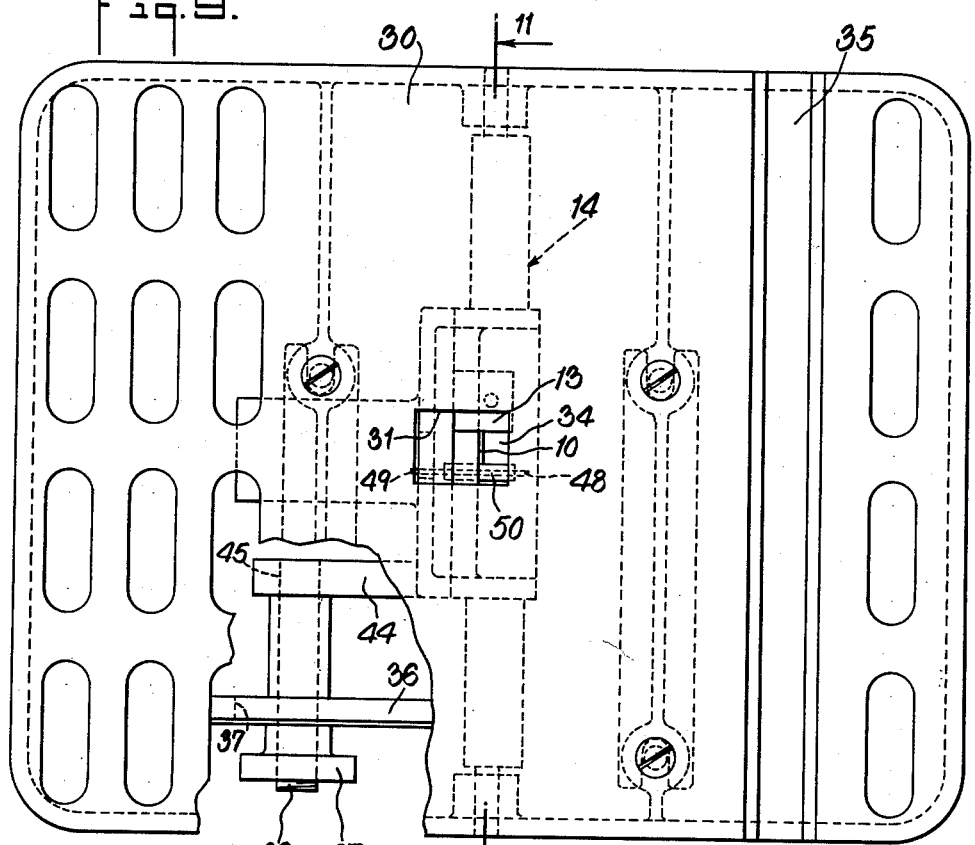
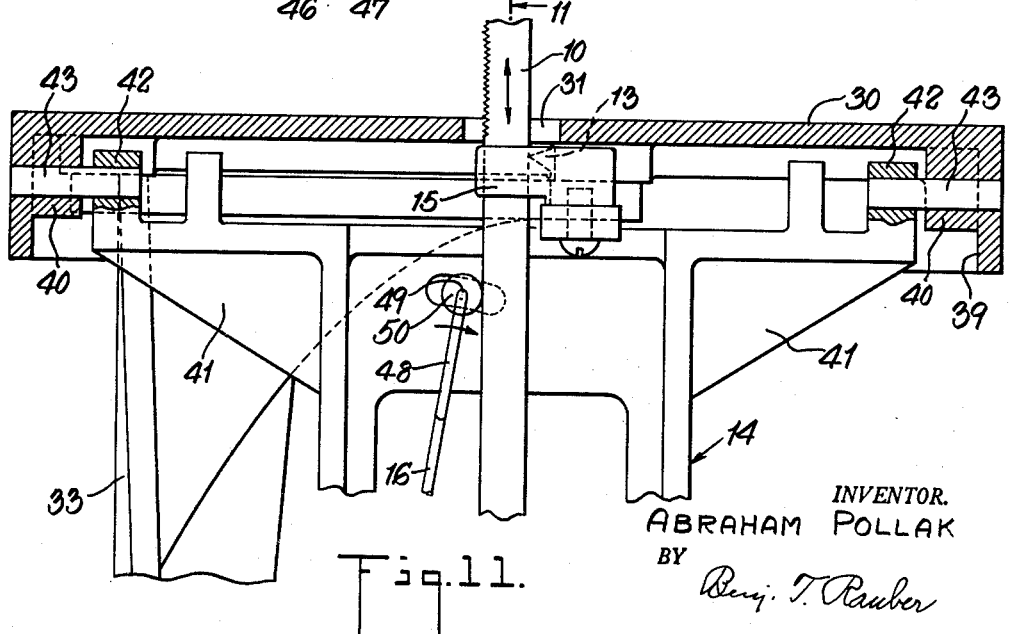
INVENTOR.
ABRAHAM POLLAK
BY
Benj. T. Rauber
ATTORNEY Nov. 19, 1963 A. POLLAK 3,111,147
SABRE SAW MACHINE
Filed March 22, 1961 5 Sheets-Sheet 5
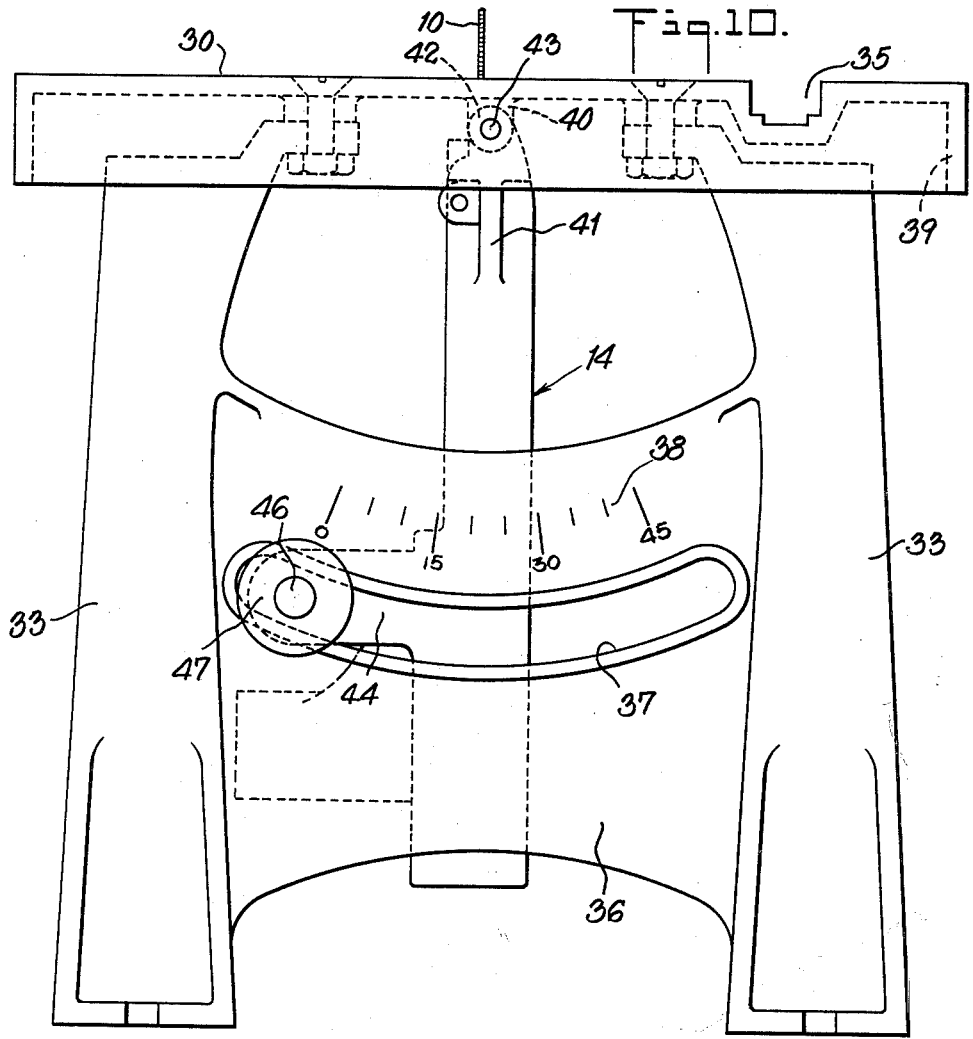
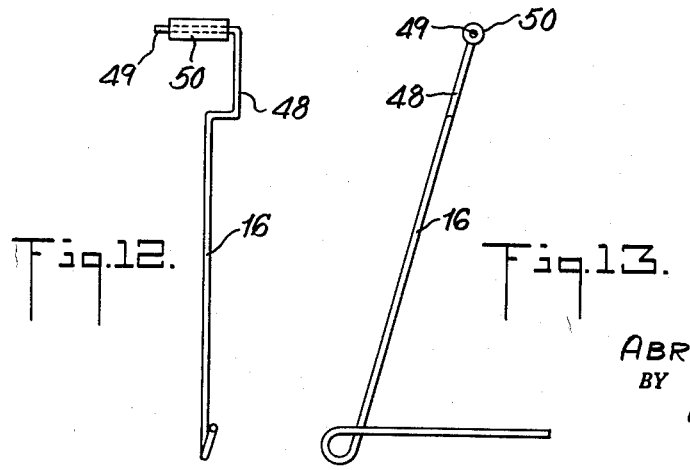
INVENTOR.
ABRAHAM POLLAK
BY
ATTORNEY United States Patent Office 3,111,147
Patented Nov. 19, 1963

3,111,147
SABRE SAW MACHINE
Abraham Pollak, 1 Main St., Linfield, Pa.
Filed Mar. 22, 1961, Ser. No. 97,482
11 Claims. (Cl. 143—72)

My present invention relates to improvements in sabre saw machines, that is, to machines having a cutting blade extending from a driving means upwardly through a work table, the cut being made on the down stroke of the blade.

In my invention the reciprocating element is limited to a cutting blade. The mass and therefore the inertia of the blade is small as compared to the rotary driving means and this enables the cutting blade to be driven at a high speed and correspondingly provides a high cutting capacity of the machine. My invention preferably eliminates all moving parts between the rotary member and the blade. In my invention, also, on the return stroke of the blade the blade is lifted or moved away from the part of the work piece engaged by the cutting edge of the saw thus relieving the work piece from any lifting forces. Also the tendency for the blade to bind on the work piece is substantially eliminated or reduced.

The various features of my invention are illustrated by way of example in the accompanying drawings, in which:

FIG. 1 is a front elevation of a machine embodying a preferred form of the invention;

FIG. 2 is a side elevation of the machine of FIG. 1;

FIG. 3 is a side elevation of a portion of the machine on a larger scale than that of FIG. 2;

FIG. 4 is a vertical section of the machine taken on line 4—4 of FIG. 3;

FIG. 5 is a side view of a detail of the machine illustrating the different positions of the blade relative to the work piece during successive portions of a sawing cycle;

FIGS. 6, 7 and 8 are diagrammatic side views illustrating angles of the blade in successive portions of a sawing cycle;

FIG. 9 is a plan view of the assembly of a table and its support with the sabre saw and its actuating means;

FIG. 10 is a side view of the table and its supporting legs;

FIG. 11, Sheet 4, is a section on the line 11—11 of FIG. 9 of the upper portion of the table and sabre saw and its mechanism;

FIG. 12 is a view of an improved spring for holding the sabre saw in a sliding pivotal connection, and FIG. 13 is a side view of the spring shown in FIG. 12.

Referring to FIG. 3 for an illustration of the relation of the saw blade to the driving and guiding elements, a saw blade 10 is secured by a pin 11 at its lower end to a rotatable fly wheel 12. The pin 11 is eccentric to the axis of the fly wheel and the blade is reciprocated vertically by the fly wheel. The blade is positioned and guided in its vertical reciprocation by a fulcrum 13 on an enclosing housing 14 and is spaced vertically above the fly wheel and held from sidewise movement by a pair of guide surfaces 15 extending forwardly from the fulcrum and between which the blade reciprocates. A wire spring 16 having a hook 17 engaging the forward edge of the blade at the fulcrum 13 holds the rear edge of the blade resiliently against the fulcrum. The spring 16 is supported at its lower part on a pin 18 projecting from a wall of the housing, the wire being bent about this pin, and is tensioned by a length 19 extending below and bearing upwardly against a pin 20 spaced from the pin 18. The spring is retained on the pins 18 and 20 by screw and washer assemblies 21 and 22, respectively. A stud 23 projecting from a wall of the housing above the pin 18 may also provide additional support to the spring 16.

As shown in FIG. 4, the spring length 19 bears against the side of the blade 10 and holds it from displacement from the pin 11. The spring and blade may be removed for replacement by unscrewing the screw and washer assemblies 21 and 22, then slipping the spring from the pins 18 and 20 after which the spring and blade may be slipped downwardly from the fulcrum and guides 15 and replaced.

The housing 14 comprises a back wall 24 on which the fulcrum 13, the guides 15 and stud 23 and pins 18 and 20 are mounted. It also comprises an edge wall 25 encircling the side and lower edges of the wall 24. The wall 24 is also provided with a bearing 26, FIGS. 1 and 4, for the shaft of the fly wheel 12. The shaft may be rotated by any suitable means, not shown.

A pair of trunnions 27 and 28 project outwardly from opposite side edges of the housing 14 at the upper edge of the housing in alignment with each other and with the plane of the blade 10 by means of which the housing may be pivotally suspended from a bridge member 29 as shown in FIG. 2. The bridge member is supported by a table 30 as shown in FIGS. 1, 2, 5, and 9–11, the table being provided with a slot 31 through which the upper part of the blade 10 projects. As shown the axis of the trunnions 27 and 28 is approximately in alignment with the lower surface of the table and with the blade 10 and preferably slightly above the pivot edge of the fulcrum 13. By means of this arrangement, the housing may be turned on the axis of the trunnions to incline the housing and the blade to any desired angle to the surface of the table to enable a cut to be made in a plane at an angle to the surface of the table and of the work piece. The slot 31 is of sufficient dimension to provide for the desired range of inclination of the blade. The housing may be held in any selected position of inclination to the surface of the table by suitable means such as shown in FIG. 10.

The operation of the saw blade is illustrated in FIGS. 3 and 5 to 8. The flywheel 12 is rotated clockwise, as shown in FIG. 3, and the saw blade makes a cut on its downward stroke as this tends to press the work piece onto the surface of the table. Starting from the vertical position of the blade shown in FIG. 3, the upper, cutting, part of the blade tilts progressively to the left about the fulcrum 13 as the fly wheel turns through 180° thereby pressing the cutting edge against the work piece held to the left of the saw blade. The successive positions of the saw blade are indicated by the broken lines of FIGS. 3 and 5. As the fly wheel moves through the lower part of this half rotation, that is, from the 3 o'clock to the 6 o'clock position, the saw blade returns to a vertical position. During the return half rotation the saw blade tilts in the opposite direction, that is, away from the work piece. This relieves the work piece from the upward thrust of the saw blade and avoids any tendency to lift the work piece from the table. The tilt of the saw blade during the down stroke is shown in FIG. 6, the position at the beginning and end of the down stroke is shown in FIG. 7 and the position during the up stroke is indicated in FIG. 8.

It is to be noted also that the only reciprocating part is the saw blade, which is of relative slight or insignificant weight or mass. The machine may therefore be operated at high speeds with a minimum of vibration and therefore with a greater cutting speed, particularly in cutting wood.

FIGS. 9, 10 and 11 show the manner of mounting the sabre saw mechanism with respect to a work supporting table and also show certain modifications or improvements.

In the combination shown in FIGS. 9, 10 and 11, the table 30 is mounted upon supports or legs 33. The table is provided with an opening 34 through which the sabre saw blade 10 projects. The top of the table may be grooved as at 35 from the front to the rear to receive and hold a guiding straight edge for the work to be sawed. The table legs may be joined by a web 36, as shown in FIG. 10, and this web is provided with an arcuate slot 37 centered upon the axis of suspension of the sabre saw housing 14. Degree marks are also provided adjacent the arcuate slot 37 as indicated at 38 to mark the inclination at which the flat face of the sabre blade is set relative to the upper surface of the table. The table is provided with downturned flanges 39, as shown in FIG. 11, and also with bosses 40 aligned with the axis of suspension of the sabre saw housing 14.

At its upper end the sabre saw housing 14 has sidewise extensions 41 and ears 42 extending upwardly therefrom in a position adjacent the bosses 40. The boss 40 and ears 42 have aligned or coaxial openings in which are mounted stub axles 43 to support the housing 14 to swing or tilt on the axes of the shafts. The axes of the shafts 43 extend on a median line from front to rear of the table 30.

Having described my invention, I claim:

1. A sabre saw machine which comprises a rotatable fly wheel, a sabre saw blade pivoted eccentrically on said flywheel and having smooth front and rear edges extending from said flywheel and saw teeth on its front edge beyond said smooth edge, a fulcrum spaced from said flywheel in position to support the smooth portion of the rear edge of said saw blade on which said saw blade may pivot and slide, and a spring engaging the smooth portion of said front edge of said saw blade and resiliently pressing said saw blade against said fulcrum.

2. The sabre saw machine of claim 1 in which said spring is a wire spring anchored between said fulcrum and said flywheel and extending toward said fulcrum and bearing against the front edge of said saw blade.

3. The sabre saw machine of claim 2 having a pin on which said spring is anchored, a second pin against which one end of said spring bears, the opposite end of said spring bearing against the front edge of said saw blade.

4. The sabre saw machine of claim 1 in which said fulcrum has guide surfaces between which said saw blade extends and is guided.

5. The sabre saw machine of claim 3 in which said spring is retained on said pins by screws and in which the lower part of the saw blade is retained on said fly wheel by said spring.

6. A sabre saw machine which comprises a vertical wall, a pair of trunnions mounted on said wall at the upper part of said wall and aligned on an axis parallel with said wall, a bearing in said vertical wall below and on an axis transverse to the axis of said trunnions, a pair of supports on said vertical wall between the axes of said bearing and of said trunnions, a fulcrum on said wall above said supports, a flywheel mounted in said bearing, a sabre saw blade pivoted eccentrically on said fly wheel and extending upwardly therefrom past said fulcrum and having a smooth rear edge bearing against said fulcrum and having a smooth front edge extending toward said fulcrum and saw teeth beyond said fulcrum and a wire spring anchored on said supports and bearing against the smooth front edge of said saw blade to press it against said fulcrum.

7. The sabre saw machine of claim 6 in which said pair of supports are pins extending from said vertical wall and in which said spring is supported and slidable axially on one of said pins and bears at one end on the other pin and extends upwardly and is bent at its upper end to a bight bearing against said saw blade.

8. The sabre saw machine of claim 7 having a third support bearing against said spring between said pair of supports and the upper end of said spring.

9. The sabre saw machine of claim 6 in which said fulcrum is provided with guide surfaces in which said saw blade reciprocates.

10. The sabre saw machine of claim 6 having a supporting table from which said wall depends, said table having a pair of axially aligned bearings to receive said trunnions and a slot through which said saw blade projects.

11. The sabre saw of claim 2 having a roller mounted on said spring with its axis of rotation at a right angle to the plane of the saw blade and in position to bear against said front edge of the saw blade.

References Cited in the file of this patent

UNITED STATES PATENTS

| | | |
|---|---|---|
| 977,028 | Maxwell | Nov. 29, 1910 |
| 1,169,221 | Wilson | Jan. 25, 1916 |
| 1,428,208 | Bills | Sept. 5, 1922 |
| 2,634,771 | Gardner | Apr. 14, 1953 |
| 2,652,863 | Grabinski | Sept. 22, 1953 |
| 2,725,905 | Pulera | Dec. 6, 1955 |
| 2,782,811 | Johnson | Feb. 26, 1957 |
| 2,842,171 | Weikart et al. | July 8, 1958 |

FOREIGN PATENTS

| | | |
|---|---|---|
| 557,731 | France | May 9, 1923 |